(12) United States Patent
DePottey et al.

(10) Patent No.: US 7,261,319 B2
(45) Date of Patent: Aug. 28, 2007

(54) AIRBAG CUSHION WITH ADAPTIVE VENTING FOR REDUCED OUT-OF-POSITION EFFECTS

(75) Inventors: Timothy A. DePottey, Flint, MI (US); David W. Schneider, Waterford, MI (US)

(73) Assignee: Autoliv ASP, Inc., Ogden, UT (US)

( * ) Notice: Subject to any disclaimer, the term of this patent is extended or adjusted under 35 U.S.C. 154(b) by 36 days.

(21) Appl. No.: 11/031,394

(22) Filed: Jan. 7, 2005

(65) Prior Publication Data
US 2006/0151979 A1 Jul. 13, 2006

(51) Int. Cl.
*B60R 21/276* (2006.01)
(52) U.S. Cl. ................. 280/739; 280/743.1; 280/743.2
(58) Field of Classification Search ................ 280/739, 280/743.2, 743.1
See application file for complete search history.

(56) References Cited

U.S. PATENT DOCUMENTS

| 5,280,953 | A | | 1/1994 | Wolanin et al. ............. 280/739 |
|---|---|---|---|---|
| 5,405,166 | A | | 4/1995 | Rogerson ................... 280/739 |
| 5,931,497 | A | * | 8/1999 | Fischer .................... 280/743.1 |
| 6,095,557 | A | | 8/2000 | Takimoto et al. ........... 280/739 |
| 6,139,048 | A | | 10/2000 | Braunschädel ............. 280/728.1 |
| 6,183,003 | B1 | * | 2/2001 | Matsuhashi et al. ...... 280/728.2 |
| 7,059,634 | B2 | * | 6/2006 | Bossecker et al. .......... 280/739 |
| 2004/0012179 | A1 | | 1/2004 | Pinsenschaum et al. .... 280/739 |
| 2004/0056459 | A1 | | 3/2004 | Kassman et al. ........... 280/739 |
| 2004/0090054 | A1 | * | 5/2004 | Bossecker et al. .......... 280/739 |
| 2005/0236822 | A1 | * | 10/2005 | Rose et al. ................. 280/739 |
| 2006/0071461 | A1 | * | 4/2006 | Williams et al. ............ 280/739 |
| 2006/0071462 | A1 | * | 4/2006 | Smith et al. ................ 280/739 |

FOREIGN PATENT DOCUMENTS

JP 05085295 4/1993 ................ 280/736

OTHER PUBLICATIONS

Search Report and Written Opinion concerning the Corresponding International Application No. PCT/US05/27255.

* cited by examiner

*Primary Examiner*—Eric Culbreth
(74) *Attorney, Agent, or Firm*—Sally J Brown; Stoel Rives, LLP

(57) ABSTRACT

An airbag cushion is disclosed for use in automotive protective systems. The airbag cushion includes a vent flap that, prior to cushion deployment, extends from the cushion exterior through a vent. A strap is coupled to the vent flap and to an interior surface of the cushion. Upon airbag deployment, the strap extends until taut or extends until the cushion encounters an obstruction. If pulled taut, the strap pulls the vent flap into the cushion interior where the interior air pressure effectively presses the vent flap against the vent. If the cushion encounters an obstruction, the strap remains lax, and the vent remains open. Devices are provided for retaining the vent in the closed position during occupant ride down.

20 Claims, 5 Drawing Sheets

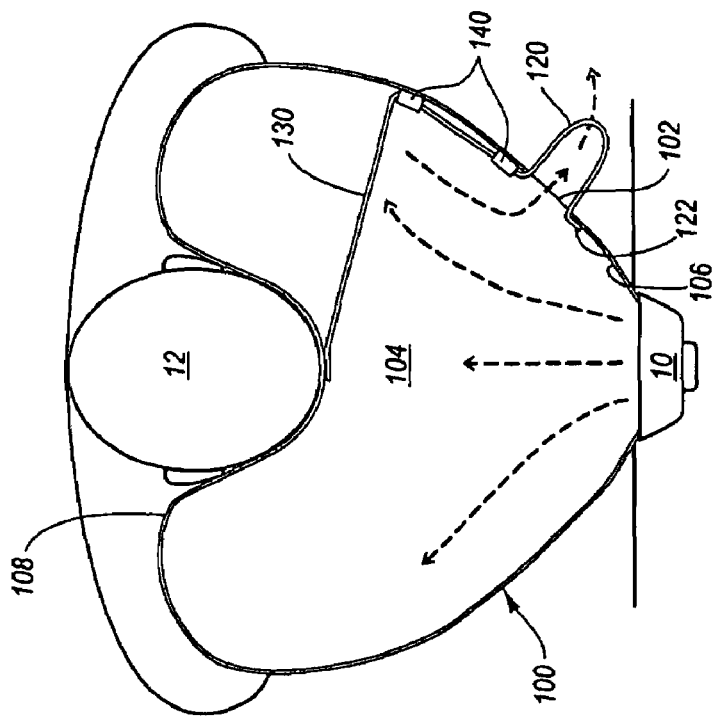
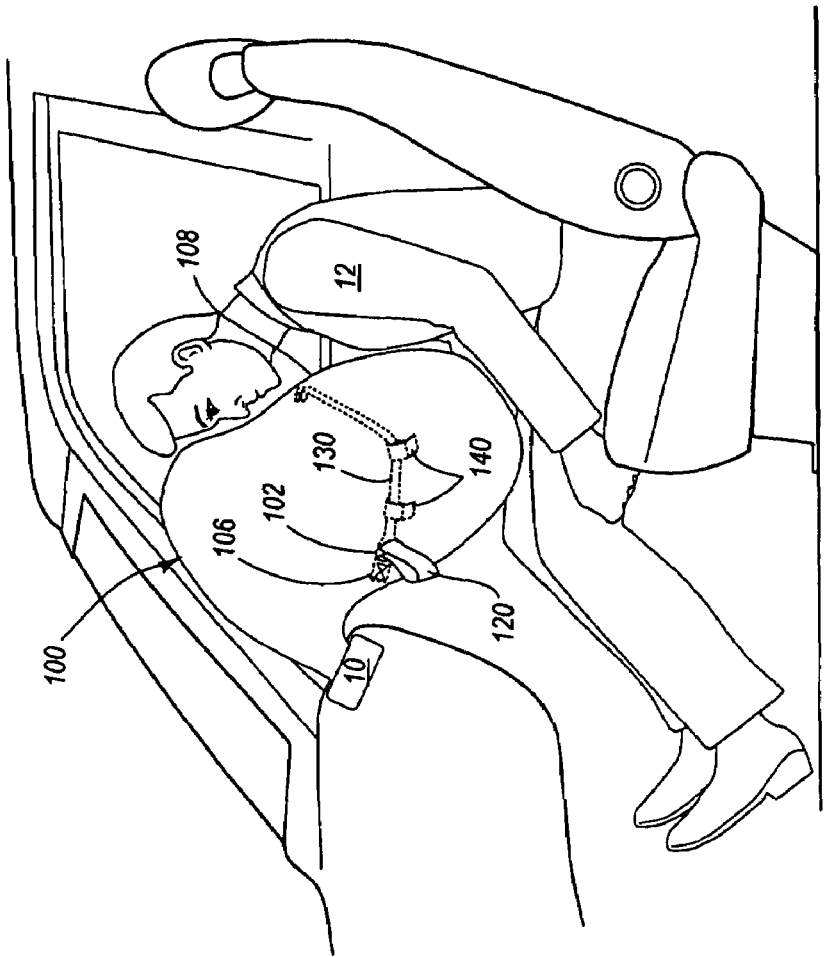
Fig. 1B
Fig. 1A

AIRBAG CUSHION WITH ADAPTIVE VENTING FOR REDUCED OUT-OF-POSITION EFFECTS

TECHNICAL FIELD

The present invention relates generally to the field of automotive protective systems. More specifically, the present invention relates to inflatable airbags for automobiles.

BRIEF DESCRIPTION OF THE DRAWINGS

Understanding that drawings depict only typical embodiments of the invention and are not therefore to be considered to be limiting of its scope, the invention will be described and explained with additional specificity and detail through the use of the accompanying drawings in which:

FIG. 1A is a side view of an embodiment of a deploying airbag cushion.

FIG. 1B is a cross-sectional view of the airbag of FIG. 1A.

DETAILED DESCRIPTION OF PREFERRED EMBODIMENTS

Figure 2B:
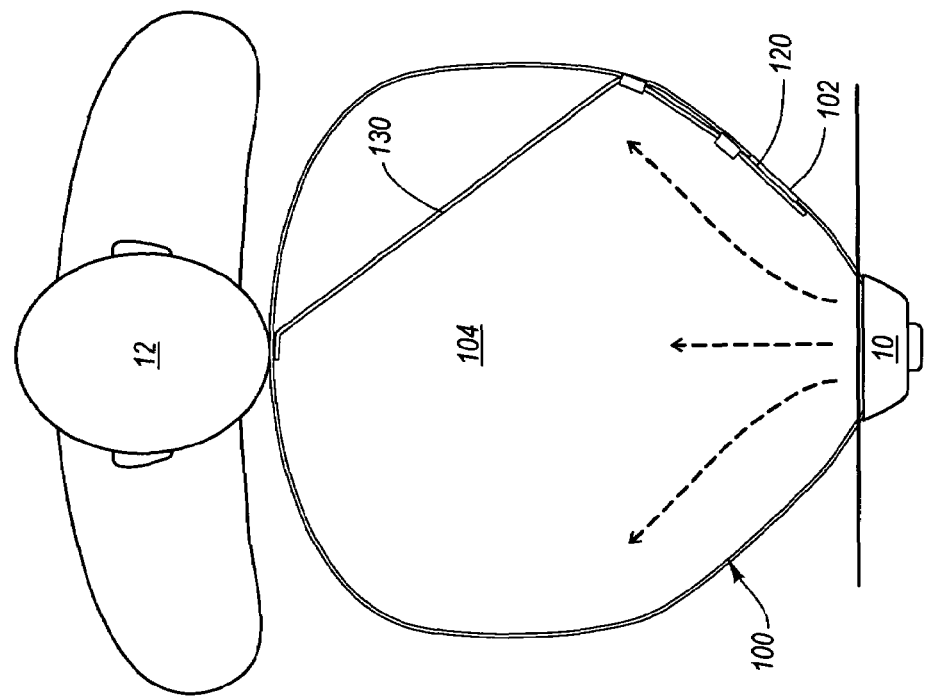
FIG. 2B is a cross-sectional view of the airbag of FIG. 2A.

Described below are embodiments of an airbag cushion and venting mechanism. As those of skill in the art will appreciate, the principles of the invention may be applied to and used with a variety of airbag deployment systems including frontal driver and passenger airbags, knee airbags, overhead airbags, curtain airbags, and the like. Thus, the present invention is applicable to airbag cushions of various shapes and sizes.

Airbag cushions are frequently located in an instrument panel and directly in front of an occupant. During a collision, the airbag cushion inflates and deploys through a cosmetic cover. The airbag cushion deploys towards the occupant and provides a restraint. A potentially dangerous situation occurs when an occupant is positioned too closely to the airbag which causes the occupant to contact the airbag as it is deploying. Ideally, the occupant should be in position to impact the airbag only after full deployment. It would be advantageous to provide an airbag with a softer deployment when an occupant is out-of-position. Embodiments described below provide an airbag cushion that responds to an occupant's position and vents accordingly to reduce the severity of a deploying contact. With reference now to the accompanying figures, particular embodiments of the invention will now be described in greater detail.

Referring to FIGS. 1A and 1B, views of a deployed airbag cushion 100 are shown. The airbag cushion 100 is deployed from an instrument panel 10 to restrain an occupant 12 who is "out-of-position" and is impeding airbag cushion deployment. An out-of-position occupant 12 is one who is seated in a forward position so as to obstruct the path of airbag cushion deployment. The airbag cushion 100 includes a vent 102 that allows gas to exit to enable cushion deflation. A vent flap 120 is coupled to an interior surface 106 of the cushion 100 and proximate to the vent 102. Before deployment of the cushion 100, the vent flap 120 partially extends out of the vent 102 and then enters back into the vent 102. In so doing, the vent flap 120 forms a U-shape outside of the vent 102 and allows gas to exit through the vent 102.

A strap 130 is coupled at one end to the vent flap 120 and at an opposing end to the interior surface 106. The strap 130 is coupled to the interior surface at a location opposing a face surface 108 that contacts an occupant 12. One or more loops 140 are coupled to the interior surface 104 and retain the strap 130 in position. The vent flap 120 and the strap 130 may be integrally formed or may be coupled to one another by stitches, bonds, or adhesives. The vent flap 120 and strap 130 may include a nylon fabric material or any other material suitable in the art.

During deployment, the strap 130 is initially slack and the vent flap 120 remains partially outside of the cushion interior 104. As the airbag cushion 100 deploys, the face surface 108 contacts the out-of-position occupant 12. Because of the limited deployment, the strap 130 is not able to fully extend and the vent flap 120 remains extending through the vent 102. Gas freely vents through the vent 102 and pushes against the vent flap 120 so that the vent 102 is not obscured. The airbag cushion 100 builds up less pressure and avoids injuring an occupant 12 impeding the deployment.

Figure 2A:
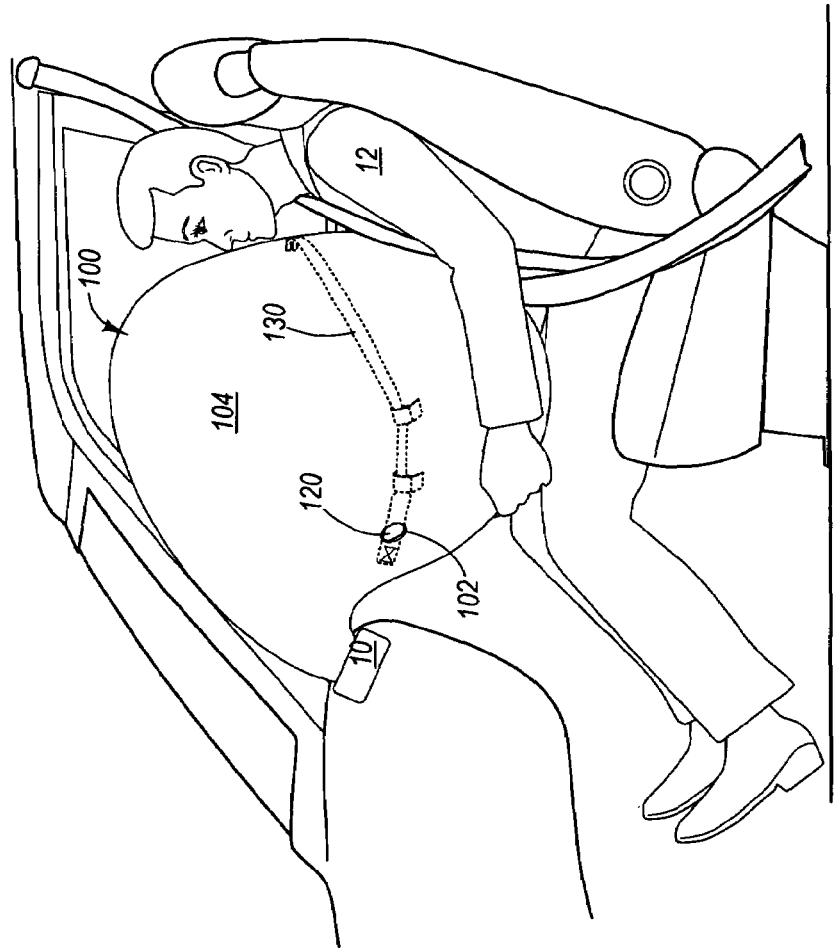
FIG. 2A is a cross-sectional view of an embodiment of a deployed airbag.

Referring to FIGS. 2A and 2B, views of deployed airbag cushion 100 are shown without the occupant 12 obstructing deployment. The airbag cushion 100 is able to fully deploy before contacting the occupant 12 thereby providing maximum restraint. As the airbag cushion 100 deploys, the strap 130 is pulled until taut which forces the entire vent flap 120 into the cushion interior 104. The vent flap 120 is pressed against the vent 102 by the interior gas pressure. The vent flap 120 is sized to extend through the vent 102, enter the cushion interior 104, and close against the vent 102 without exiting through the vent 102.

Figure 3:
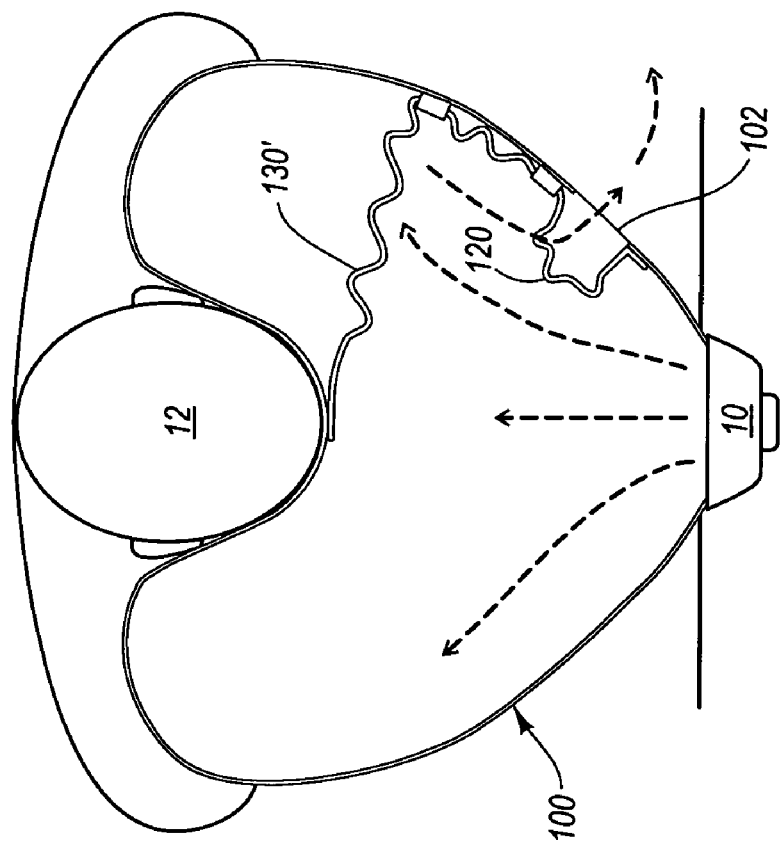
FIG. 3 is a cross-sectional view of an embodiment of an airbag after deployment.

Referring to FIG. 3, a cross-sectional view of a of an airbag cushion 100 is shown after deployment and during "ride-down." During ride-down, the airbag cushion 100 vents gas through seams or through optional unobstructed vents (not shown). The airbag cushion 100 begins to contract and the strap 130 becomes slack. The vent flap 120 is not locked into a closed position and may move due to the slack to allow further venting through the vent 102.

Figure 4:
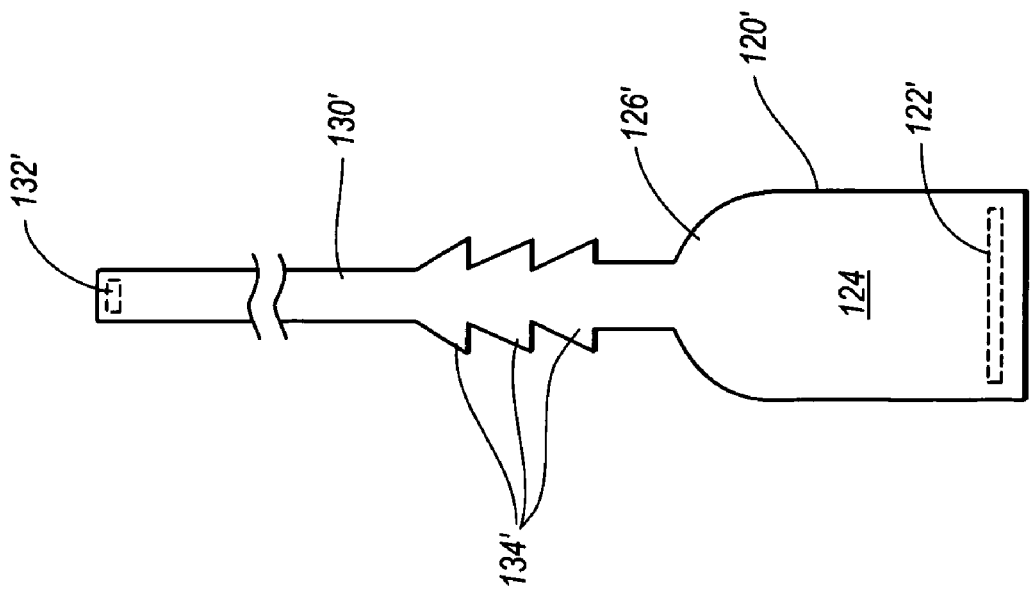
FIG. 4 is a plan view of an embodiment of a vent flap and strap.

Referring to FIG. 4, a plan view of another embodiment of a vent flap 120' and a strap 130' is shown. The vent flap 120' is coupled to at an end 122' to an interior surface 106 proximate to the vent 102. Coupling may be by stitches, bond, or adhesives. The vent flap 120' includes a surface 124 sufficient to press against and cover the vent 102 without exiting through the vent 102. The vent flap 120' may be configured to not completely cover the vent 102 when some limited venting is required. In the illustrated embodiment, the vent flap 400 includes a converging portion 126' that converges to the strap 130'. One of skill in the art will appreciate that the vent flap 120' may be configured in a variety of shapes, all of which are included within the scope of the invention.

The strap 130' is depicted as a rectangular shaped member, although it may be embodied in other shapes including a cord or braid. The strap 130' is coupled to at an end 132' to the interior surface 106 by stitches, bonds, adhesives, or the like. The strap 130' may optionally include one or more tabs 134' that are configured to pass through a loop 140 in a deployment direction, but restrict movement through the loop 140 in the opposite direction such as during ride-down. The tabs 134' may be arrayed in a "pine-tree" configuration as depicted or in other configurations known in the art.

Figures 5A, 5B:
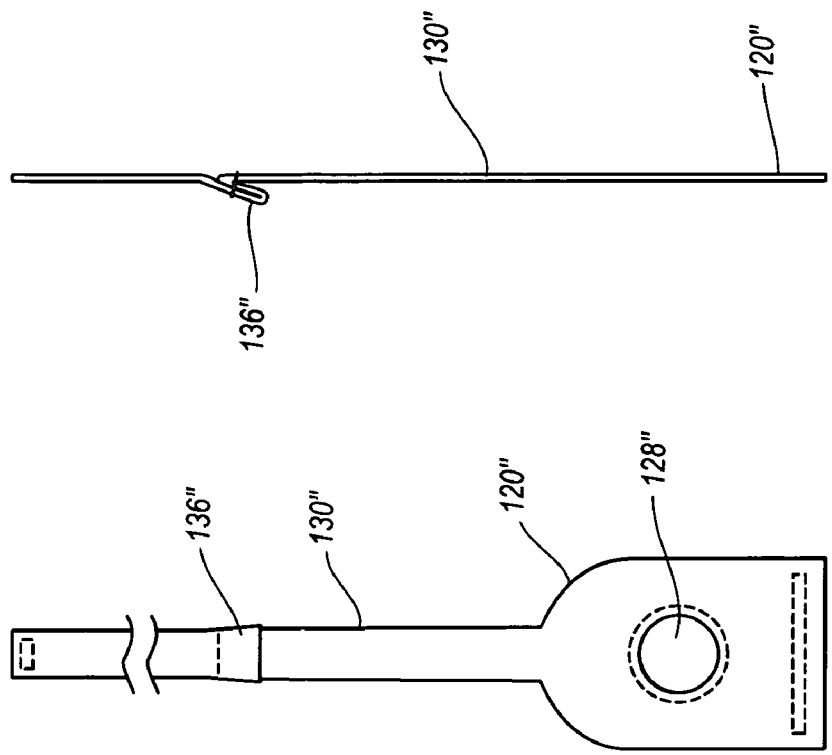
FIG. 5A is a plan view of an embodiment of vent flap and strap.
FIG. 5B is a side view of the vent flap and strap of FIG. 5A.
Figure 6:
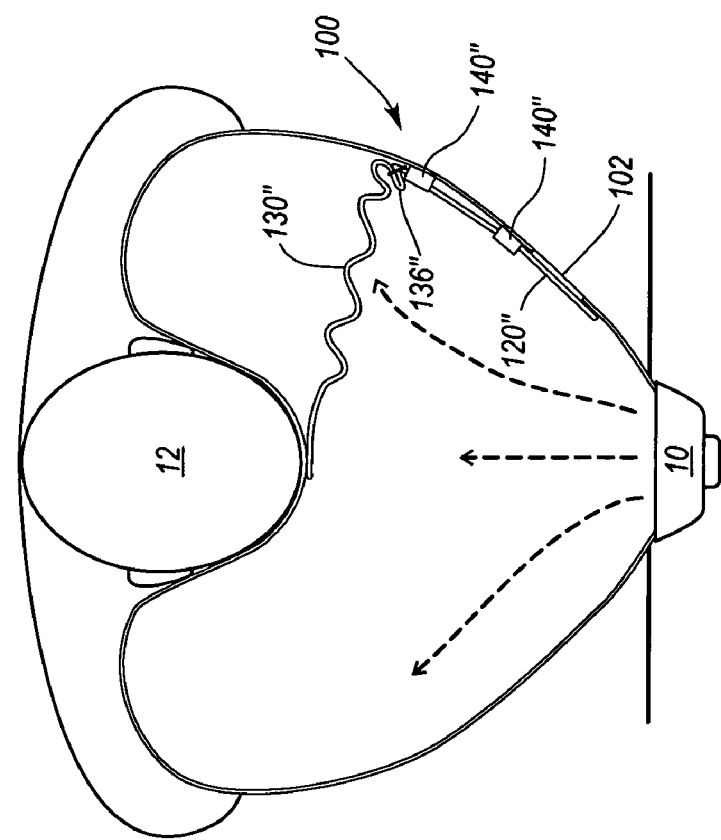
FIG. 6 is a cross-sectional view of an alternative embodiment of an airbag after deployment.

Referring to FIGS. 5A-5B and FIG. 6, views of an alternative embodiment of a vent flap 120" and strap 130" are shown. The vent flap 120" includes a flap aperture 128" that is configured to allow gas venting. When in the closed position, the flap aperture 128" aligns with the vent 102" and provides limited venting. An airbag cushion would therefore have increased venting in an out-of-position condition, and limited venting in a normal seating position.

The strap 130" includes a strap flap 136" that may be formed by folding over and securing a portion of the strap 130". Alternatively, the strap flap 136" is formed by securing a material to the strap 130". The strap flap 136" is configured to pass through a loop 140" in one direction, such as during deployment, but to catch on the loop 140 and prevent strap movement in the reverse direction. The flap 136 and loop 112 operate together to restrict movement of the strap 130 during deflation. Both the tabs 134' of FIG. 4 or the strap flap 136" of FIGS. 5A-5B may be used as a locking mechanism to retain the position of the strap 502 after airbag deployment.

Referring to FIG. 6, a cross-sectional view of an alternative embodiment of an airbag cushion 100 is shown. The airbag cushion 100 is partially deflated after deployment which causes the strap 130 to become slack. The airbag cushion 600 is similar to that previously shown but the strap 130" includes a strap flap 136". The strap flap 136" locks on the loop 140" during ride-down and retains the vent flap 120" in a closed position. In this manner, gas venting through the vent 102" continues to be restricted which may be desired in certain designs. As can be appreciated, the tabs 134' of FIG. 4 may also be used as a locking mechanism to secure the strap position and retain the vent flap 120" in a closed position.

Figure 7:
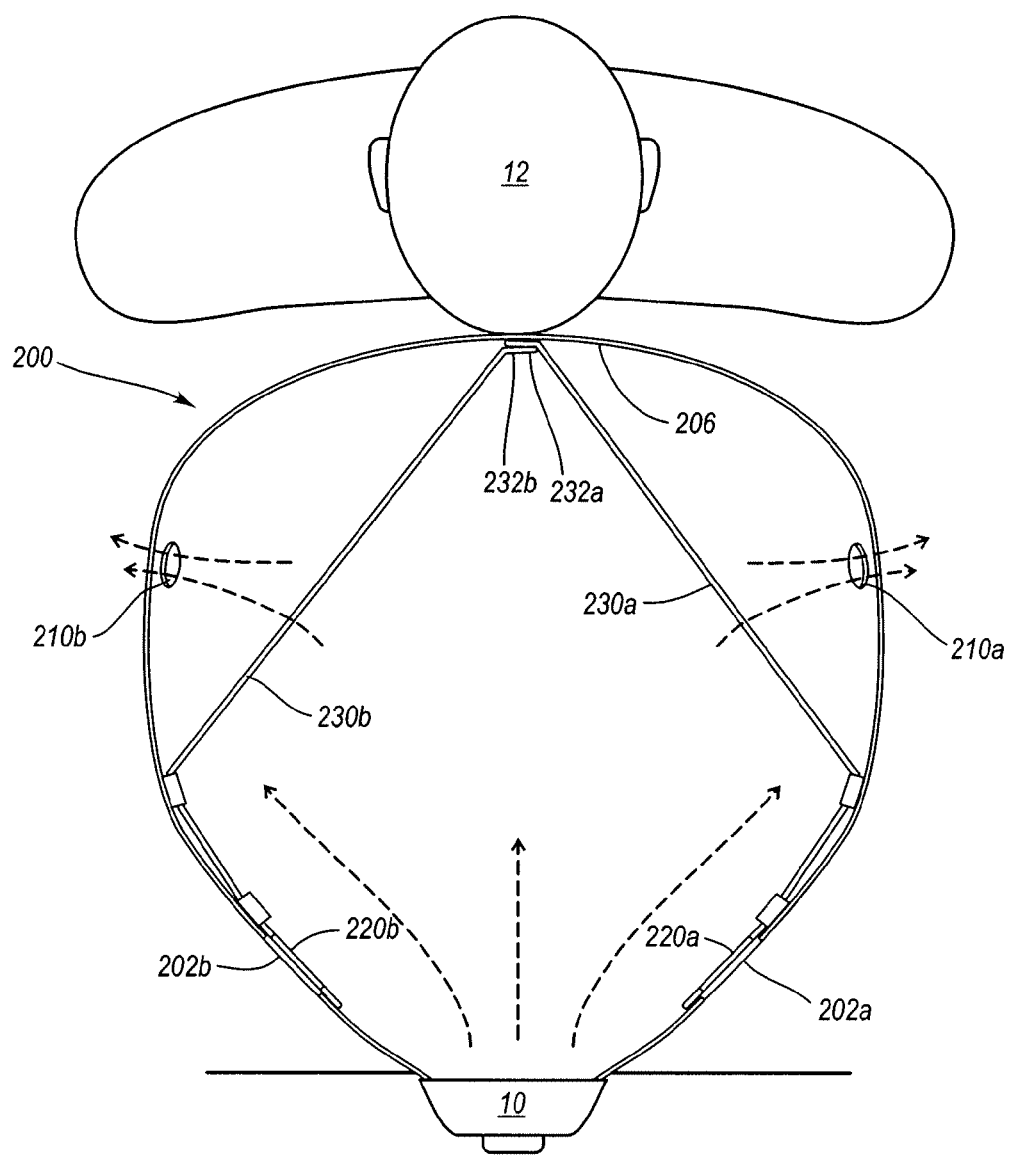
FIG. 7 is a cross-sectional view of an alternative embodiment of a deployed airbag.

Referring to FIG. 7, a cross-sectional view of an alternative embodiment of an airbag cushion 200 is shown. The airbag cushion 200 includes first and second vents 202a-b and corresponding first and second vent flaps 220a-b and first and second straps 230a-b. The vent flaps 220a-b and the straps 230a-b are configured to operate as previously described to limit deployment impact during an out-of-position condition. The straps 230a-b may be coupled at ends and proximate to one another at an interior surface 206. The vents 202a-b, vent flaps 220a-b, and straps 230a-b may be symmetrically disposed to provide evenly distributed venting. An airbag cushion 200 may include a plurality of vent, flap, and strap members as needed to provide the necessary conditional venting. The flaps may have vent apertures as in FIG. 5A and as illustrated schematically in FIG. 7.

In an alternative embodiment, a single strap may be used rather than the straps 230a-b. The single strap would be secured to vent flaps 220a-b and feed through one or more loops secured to an interior surface 206. The single strap operates similar to previously described embodiments but would not be secured to the interior surface 206.

The airbag cushion 200 may further include one or more additional vents 210a-b to increase venting. The vents 210a-b provide consistent venting in that they do not depend on an occupant's position. The vents 210a-b may be sym-metrically disposed to equalize venting distribution. The need for vents 210a-b is based on the airbag cushion design and the venting requirements. The vents 210a-b may be embodied as aperture, tubes outlets, and other shapes known in the art.

Embodiments disclosed herein illustrate novel techniques for venting an airbag cushion to retain an open vent when an occupant obstructs the path of a deploying cushion and a closed vent when an occupant does not obstruct a deploying cushion. Airbag cushions provide improved safety by deploying with less pressure when an occupant is obstructing deployment. The airbag cushions deploy with more pressure when an occupant is not obstructing deployment and when high pressure is required to provide the necessary restraint. The airbag cushions described herein have application to both driver and passenger positions. Furthermore, the airbag cushions may be configured in a variety of sizes based on design constraints.

The above description fully discloses the invention including preferred embodiments thereof. Without further elaboration, it is believed that one skilled in the art can use the preceding description to utilize the invention to its fullest extent.

It will be apparent to those having skill in the art that changes may be made to the details of the above-described embodiments without departing from the underlying principles of the invention. Embodiments of the invention in which an exclusive property or privilege is claimed are defined as follows. Note that elements recited in means-plus-function format are intended to be construed in accordance with 35 U.S.C. § 112 ¶6.

The invention claimed is:

1. An airbag cushion, comprising:
an inflatable airbag having a vent, wherein the inflatable airbag defines an inflatable airbag interior;
a strap coupled to an interior surface of the airbag;
a vent flap coupled to the strap and extending through the vent and outside of the inflatable airbag in a looped configuration which permits the vent flap to be pulled into the inflatable airbag interior;
wherein upon inflatable airbag deployment with obstruction, the strap is adapted to not fully extend and at least a portion of the vent flap remains partially outside of the inflatable airbag thereby allowing gas to exit through the vent, and
wherein upon inflatable airbag deployment without obstruction, the strap is adapted to extend and to pull the vent flap into the inflatable airbag interior.

2. The airbag cushion of claim 1, further comprising a loop disposed within the inflatable airbag interior, wherein the loop retains the strap and permits passage of the strap during airbag inflation.

3. The airbag cushion of claim 2, further comprising a strap flap coupled to the strap, wherein the strap flap is adapted to pass through the loop during airbag deployment and to restrict movement through the loop during airbag deflation.

4. The airbag cushion of claim 2, further comprising tabs disposed on the strap and adapted to enable passage through the loop during airbag deployment and to restrict movement through the loop during airbag deflation.

5. The airbag cushion of claim 1, wherein the flap further includes a flap aperture, wherein the flap aligns the flap aperture with the vent to enable gas to exit upon airbag deployment without obstruction.

6. The airbag cushion of claim 1, wherein the inflatable airbag has a second vent to vent gas during airbag deployment with and without obstruction.

7. An airbag cushion, comprising:
an inflatable airbag having a first vent and a second vent;
a first strap coupled to an interior surface of the airbag;
a first vent flap coupled to the strap and extending through the first vent and outside of the inflatable airbag in a looped configuration which permits the first vent flap to be pulled into the inflatable airbag interior;
a second strap coupled to an interior surface of the airbag;
a second vent flap coupled to the second strap and extending through the second vent and outside of the inflatable airbag in a looped configuration which permits the second vent flap to be pulled into the inflatable airbag interior;
wherein the vent flaps and straps are configured such that upon inflatable airbag deployment with obstruction, the straps do not fully extend and at least a portion of each of the vent flaps remain partially outside the inflatable airbag interior, and
wherein vent flaps and straps are configured such that upon inflatable airbag deployment without obstruction, the straps extend and pull the corresponding vent flap into the inflatable airbag interior.

8. The airbag cushion of claim 7, wherein the first and second vents are symmetrically positioned.

9. The airbag cushion of claim 7, further comprising first and second loops disposed within the inflatable airbag interior, wherein the first loop retains the first strap and the second loop retains the second strap, wherein the loops permit passage of the corresponding straps during airbag inflation.

10. The airbag cushion of claim 9, further comprising a first strap flap coupled to the first strap and a second strap flap coupled to the second strap, wherein the strap flaps are adapted to pass through the corresponding loop during airbag deployment and to restrict movement through the corresponding loop during airbag deflation.

11. The airbag cushion of claim 9, further comprising tabs disposed on the first and second straps, wherein the tabs enable passage through the corresponding loop during airbag deployment and restrict movement through the corresponding loop during airbag deflation.

12. The airbag cushion of claim 7, wherein the first and second vent flaps each include a flap aperture, wherein the first and second vent flaps align the respective flap aperture with the corresponding vent to enable gas to exit upon airbag deployment without obstruction.

13. The airbag cushion of claim 7, wherein the inflatable airbag has a third vent to vent gas during airbag deployment with and without obstruction.

14. An airbag cushion, comprising:
an inflatable airbag;
means for venting gas out of the airbag; and
means for restricting gas venting by pressing against the venting means to restrict venting gas upon inflatable airbag deployment without obstruction and enabling the venting means to remain open upon inflatable airbag deployment with obstruction by remaining extended through the venting means in a looped configuration outside of the inflatable airbag interior.

15. The airbag cushion of claim 14, further comprising a loop disposed within the inflatable airbag interior, wherein the loop retains a portion of the restricting means permits passage of the restricting means during airbag inflation.

16. The airbag cushion of claim 15, further comprising a strap flap coupled to a strap and to the restricting means, wherein the strap flap is adapted to pass through the loop during airbag deployment and to restrict movement through the loop during airbag deflation.

17. The airbag cushion of claim 15, further comprising tabs disposed on the restricting means and adapted to enable passage through the loop during airbag deployment and to restrict movement through the loop during airbag deflation.

18. The airbag cushion of claim 14, wherein the restricting means includes venting means for limited gas venting upon airbag deployment without obstruction.

19. The airbag cushion of claim 14, further comprising a vent for venting gas during airbag deployment with and without obstruction.

20. A method for manufacturing an inflatable airbag, comprising:
disposing a vent on an airbag;
coupling a vent flap to an interior surface of the airbag and extending the vent flap through the vent outside of the airbag in a looped configuration; and
coupling a strap fixed to the vent flap to an interior surface of the airbag,
wherein the vent flap, strap, and vent are configured such that upon inflatable airbag deployment with obstruction, the strap does not fully extend and the vent flap remains partially outside the inflatable airbag interior, and
wherein the vent flap, strap, and vent are configured such that upon inflatable airbag deployment without obstruction, the strap extends and pulls the vent flap into the inflatable airbag interior, the vent flap adapted to press against the vent and thereby restrict gas passing through the vent.

* * * * *